United States Patent [19]
Wing et al.

[11] 3,851,690
[45] Dec. 3, 1974

[54] MECHANISM FOR SECURING A NUT AGAINST LOOSENING

[75] Inventors: George S. Wing, Palos Verdes Estates; Harry L. Bochman, Jr., Seal Beach, both of Calif.

[73] Assignee: Hi-Shear Corporation, Torrance, Calif. ; by said Bochman, Jr.

[22] Filed: Sept. 24, 1973

[21] Appl. No.: 400,215

[52] U.S. Cl. ................................... 151/8, 285/81
[51] Int. Cl. ........................................ F16b 39/02
[58] Field of Search .............. 151/8, 28, 29, 54, 44, 151/2 R; 285/81

[56] References Cited
UNITED STATES PATENTS

| | | | |
|---|---|---|---|
| 1,189,656 | 7/1916 | Bohle | 151/2 R |
| 1,374,015 | 4/1921 | Jerruss et al. | 151/29 |
| 2,332,684 | 10/1943 | Armitage | 151/29 |
| 2,728,895 | 12/1955 | Quackenbush et al. | 151/54 |
| 2,956,604 | 10/1960 | Crotty | 151/8 |
| 3,389,735 | 6/1968 | Katz | 151/54 |
| 3,402,750 | 9/1968 | Readman et al. | 151/8 |
| 3,581,609 | 6/1971 | Greenwood | 151/8 |
| 3,670,795 | 6/1972 | Kupfrian | 151/29 |

*Primary Examiner*—Marion Parsons, Jr.
*Attorney, Agent, or Firm*—Donald D. Mon; D. Gordon Angus

[57] ABSTRACT

There is disclosed an assembly of a washer having a recess between its hub and periphery, having a base with side portions converging toward the base, and a nut positioned against the washer and mounted over a spindle. Within the recess there is an annular ring member and between the ring member and the base of the recess there is a resilient expandable and contractable ring having juxtaposed ends which normally abut each other, but are adapted to be stretched apart when pressure is applied to the ring member in the direction of pushing the resilient ring along a converging side of the recess to the base. The nut is provided with a plurality of serrations extending radially outward and the hub of the washer is provided with similar serrations also extending radially outward, the serrations of the washer and of the nut being adapted to engage serrations on the annular ring member which are radially inwardly directed. The washer has a tongue adapted to engage within a groove at the surface of the spindle to prevent rotation of the washer. When the resilient ring is in its unstrained condition it holds the annular ring member so that its serrations engage the serrations of both the washer and the nut, thereby preventing the nut from turning on the spindle. By application of a tool which applies pressure against the annular ring member toward the base of the recess the resilient ring is pushed toward the base thereby expanding the ring and resiliently straining it. With the ring member in this position its serrations are disengaged from those of the nut while remaining engaged with those of the washer and under this condition the nut can be turned on the spindle. Release of the pressure on the annular ring member enables the resilient ring to move away from the base of the recess to push and hold the annular ring member with its serrations in engagement with those of the nut as well as with those of the washer, to lock the nut on the spindle.

11 Claims, 9 Drawing Figures

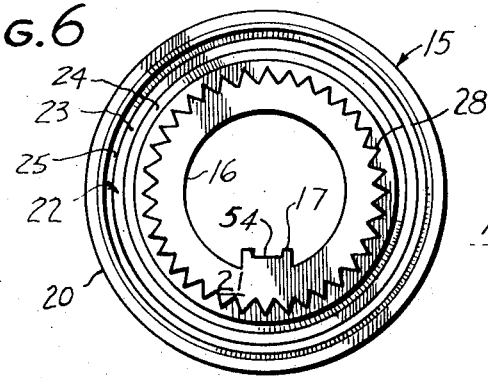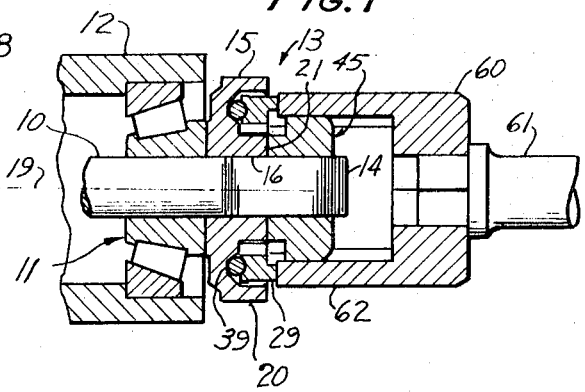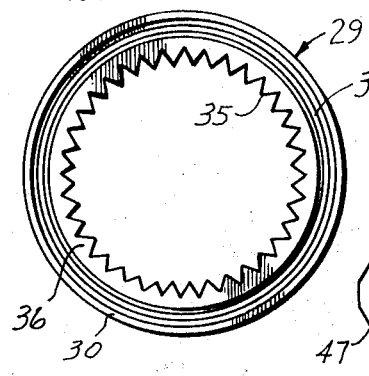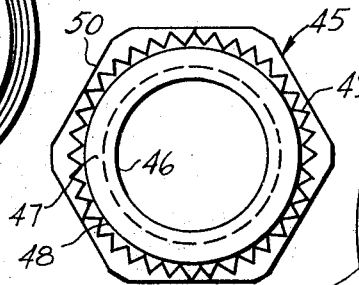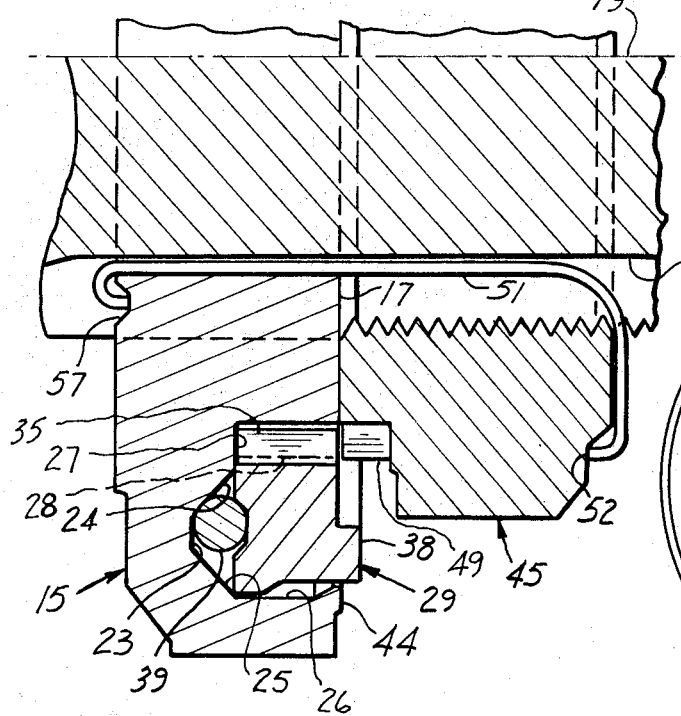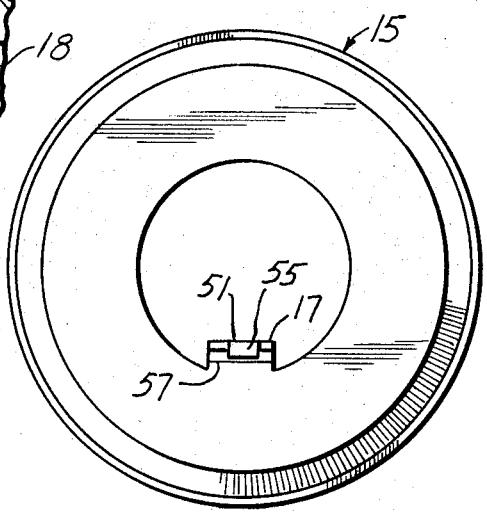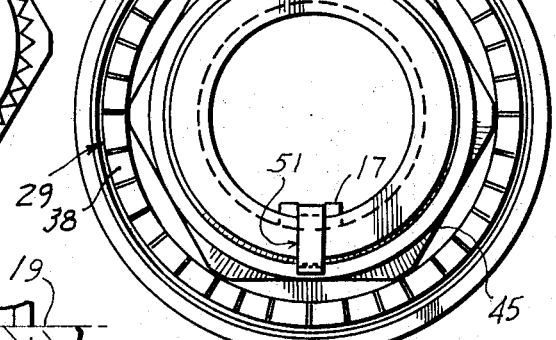

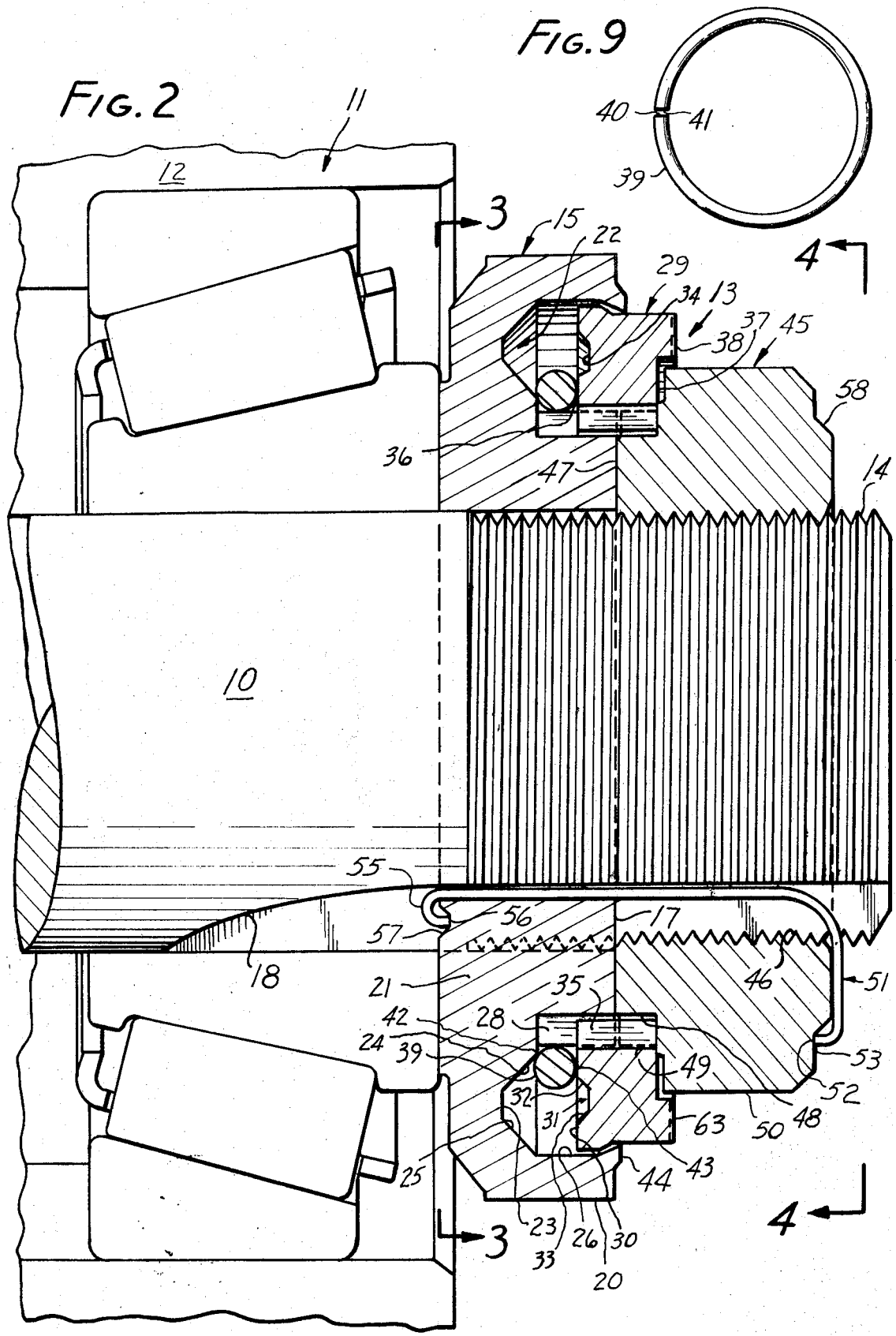

MECHANISM FOR SECURING A NUT AGAINST LOOSENING

This invention relates to a mechanism assembly for preventing loosening of a nut, and more particularly to an assembly by which the nut is locked in its tightened position on the spindle.

It is well-known that wheels such as automobile wheels are provided with bearings mounted on a spindle threaded to receive a nut which is torqued on the spindle to hold the bearing in its proper position. Care must be exercised in such practice to insure that the nut will not loosen during use and the vibrations and shocks to which the wheels are subjected in use, otherwise the wheel will not function properly and may even fall off if the nut falls off.

Expedients, such as the use of cotter pins through the spindle behind the nut or through the nut have been used. The use of cotter pins or other pins, or wires, or the like have disadvantages such as the need for precise positioning of the pin hole or holes through the spindle and the risk of weaknesses developing in the pin or wire which may result in its damage or destruction, and thereby enabling the nut to loosen.

Another expedient has been the use of well-known lock washers in front of the nut which create a frictional resistance against loosening of the nut. Such frictional devices are not positive, however, and do not eliminate the possibility of loosening of the nut.

In Greenwood U.S. Pat. No. 3,581,609 issued June 1, 1971, there is disclosed a nut locking arrangement wherein the nut is provided with an annular recess extending into the nut from its rear face and a ring member within the recess provided with a key which fits into a keyway of a bolt on which the nut is to be fitted. The outer periphery of the ring member is provided with outwardly protruding serrations adapted to mesh with serrations which protrude inwardly from the rear of the peripheral portion of the nut. A leaf spring device located at the base of the recess of the nut serves to urge the ring member rearwardly so that its serrations normally mesh with those of the nut and thereby lock the nut in position relative to the bolt. When it is desired to turn the nut on the bolt a special wrench tool is used to depress the ring member against the force of the leaf spring to disengage its serrations from those of the nut. Removal of the tool thereby causes the ring member to again engage and lock the nut. This arrangement is effective so long as the leaf spring member retains its integrity and spring quality; as it must continually exert a pressure against the ring member in order to maintain the nut locked. If the spring becomes damaged or looses its resilience over a period of time, or through shocks during usage, the ring member could disengage from the nut, allowing the nut to loosen.

An object of the present invention is to provide a mechanism for locking a nut to a spindle which provides a more positive locking than previously known arrangements.

A related object is to provide a nut locking mechanism which is foolproof and a resilient member used therein is strong and at a state of rest when the nut is locked and will not fail.

Another object is to provide means which facilitates the locking action and facilitates returning the nut to an original desired position after it has been removed from a part it is holding.

In accordance with the present invention, there is provided a means and mechanism which, though making use of a form of spring member as an element uses a form of resilient member which is inherently much stronger than can be used in the Greenwood assembly and which is normally at a position of rest when the nut is in a locked position, and furthermore, the occurrence of shocks and vibration do not materially exert any stress or strain of the resilient spring member. The principal stress and strain of the spring member occurs while torquing the nut and so long as it does not fail under such torquing it will not fail after the nut is locked.

The present invention is carreid out by an assembly of a washer member, an annular ring member sometimes herein called an indicating ring, the nut and a resiliently expandable and contractable ring sometimes herein referred to as a snap ring. The washer member is provided between its hub and a peripheral portion, with an annular recess into which the annular ring member can extend. The forward face of the nut abuts and presses against the rear face of the washer member when the nut is tightened in place. The washer is keyed to the spindle over which the washer and nut are placed to prevent rotation of the washer relative to the spindle. From the hub of the washer there extend outwardly into the recess a plurality of serrations and from a hub of the nut adjacent its inner face there extend similar serrations. The inner periphery of the annular ring is provided with serrations adapted to engage those of the washer and of the nut simultaneously to lock the nut. The recess of the washer is provided with an oblique surface slanting toward the base.

Within the recess between the annular ring member and the base of the recess there is placed the resilient expandable and contractable ring at a position such that pressure of the annular ring member against the resilient ring pushes the latter against an oblique surface of the recess causing it to strain to a different diameter as it is pushed toward the base by the annular ring member. When the annular ring member is in the position where it has pushed the resilient ring member against the base, the serrations of the annular ring member have become disengaged from those of the nut, permitting turning of the nut. When the pressure is released from the annular ring member, it is pushed back to engagement with the nut serrations again by the action of the resilient ring in returning to its normal unstressed condition. Under this locked condition, there is relatively little stress exerted against the resilient ring by the annular ring member even in the presence of great vibration and shock, because such forces exerted against the annular ring member are not in the direction which stresses the resilient ring to a substantial degree as compared with the relatively great strength which is inherent in a snap ring of this configuration.

While the nut locking mechanism of the present invention is particularly suited for use as a wheel bearing nut on the spindle on which the bearing is mounted, it is useful for other applications, such as bolts and studs.

The foregoing and other features of the invention will be better understood from the following detailed description and the accompanying drawings of which:

FIG. 1 shows in cross-section a lock nut assembly according to this invention being fastened by a torquing wrench to a spindle supporting a wheel bearing;

FIG. 2 is a cross-section view of the assembly of FIG. 1 after removal of the torquing wrench, this being the normal locked position;

FIG. 3 shows a view taken at line 3—3 of FIG. 2 but without showing the spindle;

FIG. 4 is a view taken at line 4—4 of FIG. 2, without showing the spindle;

FIG. 5 shows a detail in cross-section taken at line 5—5 of FIG. 4 under the condition that a wrench is applied as in FIG. 1;

FIG. 6 is a face view of a washer member used in the assembly of FIGS. 1 and 2;

FIG. 7 is a face view of an annular ring member used in the assembly of FIGS. 1 and 2;

FIG. 8 is a face view of a nut used in the assembly of FIGS. 1 and 2; and

FIG. 9 shows a resilient snap ring used in the assembly of FIGS. 1 and 2.

Referring to FIGS. 1 and 2 there is shown part of a spindle 10 on which is mounted a roller bearing assembly 11 fitted within the hub 12 of a wheel, in a well-known manner. A lock nut assembly 13 according to this invention is fitted over and fastened to the outer threaded end 14 of the spindle with a washer member 15 of the assembly abutted against the roller bearing assembly 11. The washer 15 has a central hole 16 dimensioned to fit over the spindle 10 with an inwardly protruding key 17 dimensioned to fit into a keyway or groove 18 formed in the surface of spindle 10 at its outer end and extending parallel to the longitudinal axis 19 of the spindle. The washer has a circular peripheral portion 20 (seen in FIG. 6) and a hub portion 21 adjacent the hole 16. Between the hub and periphery portions there is an annular recess 22 having a base 23 with sidewall portions 24 and 25 which converge toward the base 23. The outer end of converging wall 25 of the recess joins cylindrical wall portion 26 of the recess, and the outer portion of converging wall 24 connects with an annular ledge 27 which meets hub 21. At the outer periphery of hub 21 there are formed a plurality of serrations 28 protruding radially outward from the hub toward the periphery 20.

Protruding into the recess 22 there is an annular ring member 29 herein referred to as an indicating ring. The inside face 30 of this ring member, that is the face closest to the bearing 11, is seen in FIG. 7 and the peripheral portion of its outside face is shown in FIG. 4. The inside face 30 is planar except for an annular recess 31 formed therein, this recess having two sides 32 and 33 which converge toward each other to a base 34, best seen in FIG. 2. There protrude radially inwardly from annular ring member 29 a plurality of serrations 35, the inner faces 36 of which lie in the plane 30. The outer faces 37 extend in a radial direction to meet an outer annular protuberance 38. The serrations 35 of ring member 29 are proportioned and dimensioned to be able to mesh with the splines 28 of the washer 15.

Within the recess 22 there is placed a resiliently expandable and contractable snap ring 39, seen in FIG. 9, having a circular cross-section as shown in FIG. 2 and being in the form of an incomplete circle having abutting ends 40 and 41 which normally meet or nearly meet each other. The ring 39 is of resilient material, ordinarily metal, so that the ring is resiliently expandable to a larger circle than that which it has when the ends 40 and 41 abut each other. The diameter of ring 39 is such that in its normal contracted position shown in FIGS. 2 and 9 the circumference of the ring meets the junction of side portion 24 of the recess 22 with ledge 27, while another part of the circumference of ring 39 is in contact with the plane surface 30 of the annular ring member as shown in FIG. 2.

The assembly of washer 15, annular ring member 29 and snap ring 39 are held together against separation by swaging an annular lip 44 at the inner surface of the outer end of peripheral member 20 of the washer 15, so that the lip overlies a peripheral part of annular ring member 29.

A nut 45, shown as a hex nut having internal threads 46 is adapted to be threaded over the outer end of spindle 10 so that its inner face 47 abuts the outer face of washer 15. The inner face of the nut is shown in FIG. 8 and its outer face appears in FIG. 4. The portion of the inner face 47 which meets washer 15 is shouldered at 48 and from this shoulder there extend radially outward a plurality of serrations 49 dimensioned so that they can mesh with the serrations 35 of annular ring member 29, that is, serrations 39 are of substantially the same size and dimensions as serrations 28 of washer 15. At the side of serrations 49 opposite that of face 47 of the nut, there is formed the hexagonal wrench engaging portion 50 of the nut.

The nut 45 is held to the above-mentioned assembly of washer 15, annular ring member 29 and snap ring 39 by means of a spring member 51 which is in the form of a resilient strip bent so that one end 52 can be fitted to a shoulder 53 at the outside surface of the nut while the remainder of the spring member extends radially inwardly along the outside face of the nut to a position within the threads of the nut coinciding with the keyway 18 of the spindle where it bends to extend longitudinally within the keyway and through a longitudinal groove 54, best seen in FIG. 6, of key 17 forward of the inner face of the washer where the spring bends at 55 where its end 56 enters into and engages a transverse recess 57 of key 17 as is best seen in FIG. 3. When assembled in this manner the spring 51 is tensioned sufficiently to hold the nut against the washer in the manner shown in FIG. 2.

When it is desired to apply this lock nut assembly to a spindle the washer 15 is slipped over the threaded outer end of the spindle, which will require that the key 17 enter keyway 18 of the spindle, which will provide space for the spring member 51. When the nut 45 reaches the end thread of the spindle the nut will be turned which can readily be done without disturbing the spring 51, by reason of the fact that the spring end 52 rides on the rear face of the hex portion of the nut and is retained against the hex portion by reason of a bevelled annular portion 58 at the rear face of the nut.

It is noted that in the normal position of the assembled parts, as shown in FIG. 2, it is not possible to turn the nut relative to the spindle or to any of the other parts of the lock nut assembly. The reason for this is apparent from the foregoing description of the assembly, namely, that the washer 15 is keyed to the spindle while the serrations 35 of the annular ring member 29 are in mesh with both the washer serrations 28 and the serrations 49 of the nut, all of which is shown in FIG. 2. In order to permit turning of the nut on the spindle it is necessary to disengage the serrations 35 of the annular ring member 29 from the serrations 49 of the nut. This can be done by forcing the annular ring member 29 inward, that is, toward the bearing on the spindle as is illustrated in FIGS. 1 and 5. This action causes the snap ring 39 to be pushed toward the base 23 of the recess 22 attended by the enlargement of the diameter of snap ring 39 and the consequent enlargement of the gap between its ends 40 and 41. When the snap ring 39 has been pushed all the way to the base 23 as shown in FIGS. 1 and 5, the snap ring is in its tensioned condition and the serrations 35 of annular ring member 29 have become disengaged from the serrations of the nut because they have moved so that they do not extend outward as far as the serrations 49 of the nut, although serrations 35 remain in engagement with serrations 28 of the washer. When this condition exists, the nut can be turned on the spindle while the washer and annular ring member are held fixed relative to the spindle. This turning of the nut can be accomplished by use of a hollow-ended socket wrench 60 dimensioned to fit the nut. Since the particular nut illustrated herein has a hexagonal form the wrench will be in the form of a hex wrench, and it will have a handle 61.

The peripheral portion 62 of the wrench is dimensioned to engage the protuberance 38 of the annular ring member and thereby force the snap ring 39 to the base 23 of the recess as illustrated in FIGS. 1 and 5, and when the snap ring is thus pushed into the recess the wrench can torque the nut at the same time it is holding the snap ring at the base. When the torquing of the nut has been completed, withdrawal of the wrench will release the pressure against the indicator ring so that the resilience of the snap ring will contract its diameter causing the snap ring to slide outward along surface 25 of the recess, thereby pushing the annular ring member 29 outward so that its serrations engage the serrations of the nut while also remaining in engagement with the serrations of the washer as shown in FIG. 2. Under this condition the nut has been locked in position and cannot be loosened on the spindle until the snap ring is again pressured into the base of the recess.

The annular ring member is provided with radial markings 63 at its rearwardly extending protuberance 38, as seen in FIG. 4, these markings being located opposite the trough of each of its serrations 35 so as to be a visible indication when the elements are assembled, of the positions of these troughs. Hence ring member 29 may be referred to as an indicator ring. The rear face of the nut 45 is provided with a marking such as a notch 64 to indicate the position of the peak of one of its serrations 49. Since the peaks of the serrations of the nut must enter the troughs of respective serrations of the indicator ring 29, the locking of the nut to the indicator ring must leave the nut marking 64 in registration with one of the indicator ring markings 63. Thus, the markings 63 and 64 are an aid in locking the nut.

There is no particular number of serrations on the indicator ring and nut which must be used. It will be convenient, however, to use 50 serrations when using a 20-pitch thread because in that case one revolution of the nut results in 0.001 inch of longitudinal travel of the nut. When 50 serrations are used for the nut and for the indicator ring, it will be convenient to apply numerals to the markings 63 in multiples of five from 5 to 50, thus number 5 at the fifth marking, number 10 at the tenth marking, and so on to number 50. This will aid in resetting the lock nut to a specific registration if the lock nut has to be removed and later reinstalled.

In the case of wheel bearing nuts, particularly for use on automobiles, it is customary to fit the nut to the spindle at a factory. A good practice is to torque the nut until the pressure against the roller bearing commences to bind the wheel while still allowing the wheel to rotate. After rotating the wheel under this condition for a few turns the nut is backed off slightly, sufficient to free the binding condition and at this point is locked to the indicator ring. When the nut is locked up at any particular desired position, the marker or notch 64 may then be applied in such position on the nut that the marker points in any position of the circle. It will be convenient to select the position of the marker or notch 64 so that it points to any radial marking 63 numbered 5 or a multiple of 5 up to 50, where there are 50 serrations and hence fifty radial markings 63. Thus the correlation of the notch 64 with the same radial marking 63 may be easily re-established if the nut has to be disassembled for service and then reassembled to the same pre-established relationship.

It will be recognized that by the present invention there is provided a mechanism for positively locking a nut so that it will not loosen in the presence of shocks, vibration and other disturbances. The arrangement is foolproof in that the resilient element maintaining the locked condition is unstrained and in a state of rest when in the locked position. Any shocks to which the resilient element is subjected are not in a direction which readily strains it, and moreover, its structure is such that it is inherently strong and resistant to damage from shock. The arrangement is particularly adapted to use as a wheel-bearing nut, but its uses are not so limited. It is applicable for use on bolts and studs in various circumstances where nuts and bolts are used. The term "spindle" as used herein is not limited to a wheel axle spindle, or the like, but more broadly covers various threaded elements such as bolts on which nuts may be threaded.

It will be understood that the embodiments of the invention illustrated and described herein are given by way of illustration and not of limitation, and that modifications or equivalents or alternatives within the scope of the invention may suggest themselves to those skilled in the art.

What is claimed is:

1. Mechanism for locking a nut on a threaded spindle having a central longitudinal axis, comprising:

a washer having a hub portion adapted to fit over said spindle and a peripheral portion providing an annular recess having a base, between the peripheral and hub portions, and having a plurality of first serrations extending radially outward from said hub portion toward said peripheral portion;

means for keying said washer to said spindle so that the washer cannot rotate but can slide axially relative to said spindle;

an annular ring member at least partially within said annular recess providing an annular region between the annular ring member and the base of the annular recess, said ring member having a plurality of second serrations extending radially inward therefrom and matching and engaging said first serrations;

a resiliently strainable ring whose diameter can be enlarged and contracted, within said annular region;

a threaded nut adapted to thread on the threaded spindle and to abut the washer, and containing a plurality of third serrations extending radially outward and adapted to engage said second serrations;

said annular recess having a side portion which slants in a direction away from the axis toward its base, and said resiliently strainable ring when unstrained being located at a position of said side portion remote from the base so that when pressure is applied to the annular ring member in the direction of the base of the recess, the annular ring member moves axially toward said base to disengage its serrations from the serrations of the nut, and at the same time the strainable ring is moved toward said base along said slanting side portion and its diameter is resiliently altered, whereupon the nut can be turned on the spindle, and when said pressure is released the strainable ring moves out of the base and pushes the annular ring member into a position where its serrations are in engagement with the nut serrations, thereby locking the nut.

2. Mechanism according to claim 1 in which the annular ring member has a peripheral portion outward from the periphery of the nut, and the washer has a peripheral portion outward from the peripheral portion of the annular ring member.

3. Mechanism according to claim 1 in which the resilient ring has abutting unconnected ends.

4. Mechanism according to claim 3 in which the cross-section of the resilient ring is circular.

5. Mechanism according to claim 1 in which said side portion is adjacent the hub of the washer so that the resilient ring expands in diameter when pushed by the ring member.

6. Mechanism according to claim 1 in which the resilient ring has a circular shape.

7. Mechanism according to claim 1 in which a lip of the periphery of the washer overlies a portion of the annular ring member to hold the annular ring member in assembled relation to the washer.

8. Mechanism according to claim 1 in which a rear part of the periphery of the annular ring member contains markings opposite respective serrations on the annular ring member to show the location of the last-mentioned serrations.

9. Mechanism according to claim 8 in which the rear of the nut contains a marking to indicate when the serrations of the nut are in registration with serrations of the annular ring member.

10. Mechanism according to claim 1 in which the means for keying the washer to the spindle comprises an inwardly protruding key of the washer to engage a groove within the surface of the spindle.

11. Mechanism according to claim 10 in which a spring strip has one of its ends in engagement with the rear of the nut and passes within and through the nut and along the inside of the tongue of the washer and has its other end in engagement with a front surface of the washer, thereby resiliently holding the nut to the washer.

* * * * *

UNITED STATES PATENT OFFICE
CERTIFICATE OF CORRECTION

PO-1050 (5/69)

Patent No. 3,851,690　　　　　　　Dated December 3, 1974

Inventor(s) GEORGE S. WING and HARRY L. BOCHMAN, JR.

It is certified that error appears in the above-identified patent and that said Letters Patent are hereby corrected as shown below:

| | |
|---|---|
| Col. 4, line 24, | "39" should read --49-- |
| Col. 5, line 35, | "25" should read --24-- |
| Col. 7, line 25, (Claim 1, line 25) | after "tions" insert --as well as with the washer serrations-- |
| Col. 8, line 29, (Claim 11, line 4) | "tongue" should read --key-- |

Signed and sealed this 8th day of April 1975.

(SEAL)
Attest:

RUTH C. MASON
Attesting Officer

C. MARSHALL DANN
Commissioner of Patents
and Trademarks